United States Patent
Mullet et al.

(10) Patent No.: US 8,371,358 B1
(45) Date of Patent: Feb. 12, 2013

(54) REMOVABLE BATTERY SYSTEM AND METHOD

(75) Inventors: Willis Jay Mullet, Gulf Breeze, FL (US); Christopher Lee Wysoczynski, Gulf Breeze, FL (US); Richard Scott Hand, Pace, FL (US); Doug Real, Pensacola, FL (US)

(73) Assignee: Homerun Holdings Corp, Pensacola, FL (US)

( * ) Notice: Subject to any disclaimer, the term of this patent is extended or adjusted under 35 U.S.C. 154(b) by 644 days.

(21) Appl. No.: 12/315,596

(22) Filed: Dec. 4, 2008

(51) Int. Cl.
*A47G 5/02* (2006.01)
*A47H 1/00* (2006.01)
*A47H 7/00* (2006.01)

(52) U.S. Cl. ........................ 160/310; 160/405
(58) Field of Classification Search ............ 160/310, 160/311, 312, 313, 315, 318, 191, 192, 189
See application file for complete search history.

(56) References Cited

U.S. PATENT DOCUMENTS

| | | |
|---|---|---|
| 3,631,659 A | 1/1972 | Horowitz |
| 4,171,845 A * | 10/1979 | Hirsch .................. 296/97.4 |
| 4,766,941 A | 8/1988 | Sloop et al. |
| 4,979,582 A | 12/1990 | Forster |
| 5,714,855 A | 2/1998 | Domel et al. |
| 5,729,103 A | 3/1998 | Domel et al. |
| 5,793,174 A | 8/1998 | Kovach et al. |
| 5,883,480 A | 3/1999 | Domel et al. |
| 5,907,227 A | 5/1999 | Domel et al. |
| 5,990,646 A | 11/1999 | Kovach et al. |
| 6,060,852 A | 5/2000 | Domel et al. |
| 6,181,089 B1 | 1/2001 | Kovach et al. |
| 6,259,218 B1 | 7/2001 | Kovach et al. |
| 6,369,530 B2 | 4/2002 | Kovach et al. |
| 6,433,498 B1 | 8/2002 | Domel et al. |
| 6,708,750 B2 | 3/2004 | Collett et al. |
| 6,850,017 B1 | 2/2005 | Domel et al. |
| 7,237,592 B2 * | 7/2007 | Arnoux et al. ............ 160/310 |
| 7,281,561 B2 | 10/2007 | Anderson et al. |
| 7,389,806 B2 | 6/2008 | Kates |
| 2009/0139668 A1 * | 6/2009 | Naylor ..................... 160/310 |

* cited by examiner

*Primary Examiner* — Katherine W Mitchell
*Assistant Examiner* — Jeremy Ramsey
(74) *Attorney, Agent, or Firm* — J. Nevin Shaffer, Jr.

(57) ABSTRACT

In a window covering system with a shade roll, a removable battery pack system includes a battery tube conformed to fit within a shade roll with a hollow interior where the battery tube is electrically connected with the shade roll but, preferably, does not rotate with the shade roll.

15 Claims, 5 Drawing Sheets

REMOVABLE BATTERY SYSTEM AND METHOD

FIELD OF THE INVENTION

This invention relates to a removable battery system and method. In particular, in accordance with one embodiment, the invention relates, in a window covering system with a shade roll, to a removable battery pack system including a battery tube conformed to fit within a shade roll with a hollow interior where the battery tube is electrically connected with the shade roll but, preferably, does not rotate with the shade roll.

BACKGROUND OF THE INVENTION

When it comes to covering openings, such as window openings, for example only and not by way of limitation, many issues are raised. Not the least of the many issues raised is how to provide power to the cover system. Sloop et al., U.S. Pat. No. 4,766,941, discloses an electrically powered oppositely positioned pair of rollers, one at the top of the window and one at the bottom, with a shade in between and covering a window opening. Kovach et al., U.S. Pat. Nos. 5,793,174, 5,990,646, 6,181,089, 6,259,218 and 6,369,530, disclose a series of related battery operated devices for raising and lowering a window covering. Collet et al., U.S. Pat. No. 6,708,750, discloses a system similar to the Kovach devices. Anderson et al., U.S. Pat. No. 7,281,561, discloses a window assembly containing multiple layers of flexible film used to effect various open to closed positions. Domel et al., U.S. Pat. Nos. 5,714,855, 5,729,103, 5,883,480, 5,907,227, 6,060,852, 6,433,498, and 6,850,017 disclose a battery operated mini-blind shade systems.

Further, Kates, U.S. Pat. No. 7,389,806 discloses an electronically controlled roll up window shade that may be battery operated. When the batteries need to be replaced or the system repaired, however, the entire header or fascia of the system must be removed. Likewise, other battery operated systems, Domel et al. and Kovach et al., include battery packs but require the header or other major part of the system to be completely removed or disassembled in order to replace the batteries or service the system. Forster, U.S. Pat. No. 4,979,582, and Horowitz, U.S. Pat. No. 3,631,659, respectively disclose a lawnmower and a golf cart with battery fed electric motors.

Despite these prior art devices, there remain several problems. In particular, it is still a problem to provide a simple power supply to a window covering system that is easy to use, comparatively inexpensive and easy to install. The prior art systems also fail to provide a power system, even the battery systems, that is unobtrusive and that does not require the installation of wires, either exposed or unexposed, that are subject to failure and are unsightly. Two even greater issues concern the matters of weight and sound. All of the prior art power sources of which Applicants are aware are heavy, bulky items. When used in connection with widow cover systems, the result is a bulkier, less attractive cover system that is noisy as well. A further problem with battery systems is the diminished capacity of batteries exposed to heat. That is, battery systems used in high temperature locations have a much lower useful life.

Thus, there is a need in the art for a power system for use, in particular, with window cover systems that is light weight, easy to install, and comparatively inexpensive. Further, there is a need in the art for a power system that does not add ungainly bulk and that is quiet in use. It, therefore, is an object of this invention to provide a light weight, inexpensive, unobtrusive system for providing power to a window covering system. It is a further object of this invention to provide a power system that is accommodated by existing systems without adding to the dimensions of the existing system and without requiring unsightly wires. It is a still further object of the invention to provide a power system that is light weight, quiet and resistant to heat degradation.

SUMMARY OF THE INVENTION

Accordingly, the removable battery system of the present invention, according to one embodiment includes, in a window covering system with a shade roll, a removable battery system including a battery tube conformed to fit within a shade roll with a hollow interior. The battery tube is electrically connected with the shade roll As used herein the term "window covering system" includes its common meaning. Nonetheless, nothing herein should be construed as limiting the invention to systems for covering windows only. Certainly any other openings that are desired to be covered are included within the scope of the present invention such as, for example only and not limitation, doors, glass walls, and the like. Window covering systems employ "covers" or "shades" and those terms are used herein with their ordinary meaning. Any cover or shade now known or hereafter developed is included within the meaning of the term as used. Such widow covering systems include rolls to which the shade or cover is attached called "shade rolls". Shade rolls rotate so as to unroll or roll up the shade during the process of covering, and uncovering, a window opening.

Still further, the term "electrically connected" means that there is a connection between one element and another element such as between the battery tube and the shade roll. The connection may be direct or indirect. The connection may be made by electrically conductive parts, with or without the use of wires.

According to another aspect of the invention, a battery tube end support is connected with the battery tube. A bearing is also provided and it is located within the hollow interior of the shade roll and rotates with the shade roll. The battery tube end support is connected with the bearing but the battery tube does not rotate with the shade roll. In another aspect, a removable battery cap is connected with the battery tube. The battery cap includes locking tabs for locking the battery tube in place and holding at least one battery in the battery tube. In another aspect, the battery cap includes an electrical connection with the at least one battery.

In a further aspect of the invention, a header is provided. The header includes a first end support and a second end support and the shade roll is supported by the first end support and by the second end support. The battery tube, however, is supported on one end by only one of the end supports. In one aspect, the battery tube is supported on another end by a bearing support in the hollow interior of the shade roll.

According to one aspect, the battery tube is an enclosed hollow tube of similar form as the shade roll but of smaller dimension. In another aspect, the shade roll includes a first shade roll end and a second shade roll end and an opening in at least one shade roll end that is conformed to receive the battery tube such that the battery tube may be inserted and removed from the opening. Further, the battery tube seals the at least one shade roll end when inserted therein.

In another aspect, a header is provided and the header includes a pair of electrically connected end caps. The shade roll is supported by the pair of end caps and the battery tube is electrically connected with the pair of end caps.

According to another embodiment, in a window covering system with a shade roll, a removable battery system includes a header with a first end cap and a second end cap and the end caps are electrically connected. A shade roll with a hollow interior is supported by and between the first end cap and the second end cap. An enclosed battery tube, conformed to fit within the shade roll, is connected with the shade roll but does not rotate with the shade roll. The battery tube includes at least one battery and the battery tube is supported by and electrically connected with the first end cap. A battery tube end support is connected with the battery tube. A bearing is located within the hollow interior of the shade roll and rotates with the shade roll and the battery tube end support is connected with the bearing. A motor is electrically connected with the second end cap.

In another aspect, a removable battery cap is connected with the battery tube. The battery cap includes locking tabs for locking the battery tube to the first end cap and for holding the at least one battery in the battery tube. In one aspect, the battery cap includes an electrical connection with the at least one battery and the first end cap. In another aspect, a shade guide is connected with the first end cap and the second end cap for guiding a shade and the shade guide provides the electrical connection between the first end cap and the second end cap.

In a further aspect, a circuit board is connected with at least one of the end caps where the circuit board controls the speed and direction of the motor. In one aspect, the shade roll includes a first shade roll end and a second shade roll end and an opening in at least one shade roll end that is conformed to receive the battery tube. As a result, the battery tube may be inserted and removed from the opening and the battery tube seals the at least one shade roll end when inserted therein. In another aspect, the battery tube is an enclosed hollow tube of similar form as the shade roll but of smaller dimension. In one aspect, a mounting bracket is provided and the header is movably connected with the mounting bracket such that the header is movable while still connected with the mounting bracket and such that the battery tube is accessible while the header is connected with the mounting bracket.

According to another embodiment, in a window covering system with a shade roll, a removable battery method includes the steps of: providing a window covering system with a header with a first end cap and a second end cap where the end caps are electrically connected; with a shade roll with a hollow interior supported by and between the first end cap and the second end cap; with an enclosed battery tube conformed to fit within the shade roll where the battery tube is connected with the shade roll but does not rotate with the shade roll and where the battery tube includes at least one battery and where the battery tube is supported by and electrically connected with the first end cap; with a battery tube end support connected with the battery tube; with a bearing where the bearing is located within the hollow interior of the shade roll and rotates with the shade roll and where the battery tube end support is connected with the bearing; and with a motor electrically connected with the second end cap; and activating the at least one battery to operate the motor.

In another aspect, the method further includes the steps of: connecting a mounting bracket within an opening and movably connecting the header with the mounting bracket such that the header is movable while still connected with the mounting bracket and such that the battery tube is accessible while the header is connected with the mounting bracket. In another aspect, the method further includes the steps of: moving the header from an operating position and accessing the battery tube; removing the battery tube from the shade roll and replacing the at least one battery; and inserting the battery tube in the shade roll and moving the header back to the operating position.

DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE INVENTION

Figure 1:
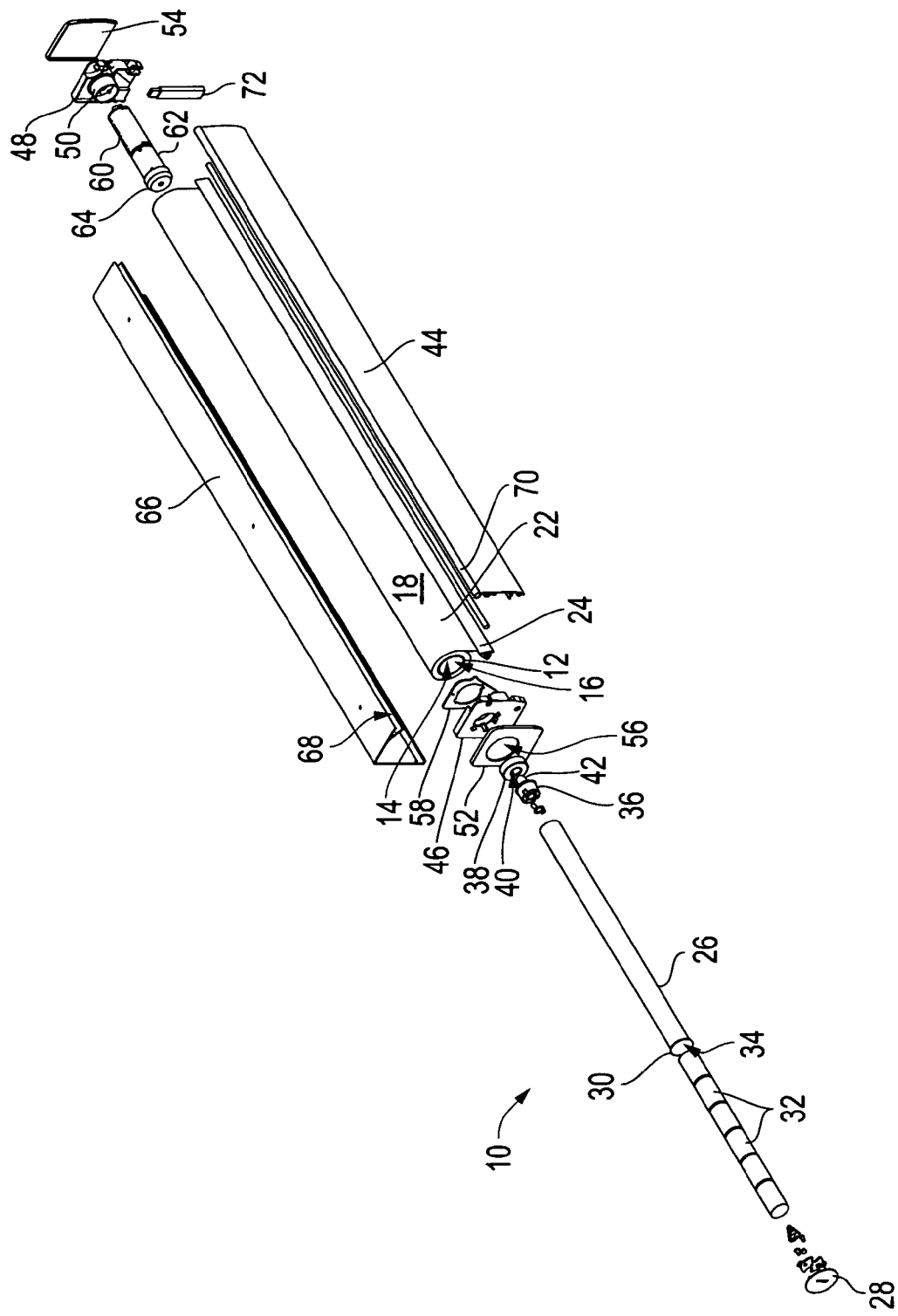
FIG. 1 is an exploded view of the removable battery system of the present invention including a window covering system with a shade roll.

The preferred embodiment of the present invention is illustrated by way of example in FIGS. 1 through 5. With specific reference to FIG. 1, a removable battery system 10, according to one embodiment, includes a shade roll 12 with a hollow interior 14. Shade roll 12 is a cylindrically shaped form. According to the invention, the shade roll 12 includes a hollow interior 14 and an exterior 16. A shade 18 is connected on a first end 20 (not shown) to shade roll 12. A second end 22 of shade 18 is connected with a bottom bar 24, for example only and not by way of limitation. Bottom bar 24 adds weight and rigidity to the second end 22 of shade 18. FIG. 1 shows shade 18 rolled in the "up" position and essentially completely rolled up on shade roll 12.

Battery tube 26 is of similar form as shade roll 12 but of smaller dimension as illustrated. Thus, as will be discussed more fully hereafter, battery tube 26 fits within hollow interior 14 of shade roll 12. Heretofore, this space, interior 14 has been unutilized for use with power sources. All prior art power sources required them to be added on to the system which results in a bigger, bulkier system as discussed above. Battery tube 26 includes battery cap 28. Battery cap 28 seals or closes open end 30 of battery tube 26. Thus, batteries 32 when inserted into the hollow interior 34 of battery tube 26 are held there by operation of battery cap 28 as will be discussed more fully with reference to FIG. 2.

FIG. 1 also illustrates battery end support 36 and bearing 38. In use, bearing 38 is pressed inside the hollow interior 14 of shade roll 12. As a result, bearing 38 moves with shade roll 12. Battery end support 36 is conformed to connect with bearing 38. As illustrated, bearing 38 includes an opening 40 and battery end support 36 includes a tapered end 42 (as more clearly shown in FIG. 3). Tapered end 42 fits within opening 40 such that when in operation, when shade roll 12 moves, bearing 38 moves but battery tube 26 remains stationary. This reduces the amount of energy required to move and stop shade roll 12 and the noise generated, among other things as will be discussed more fully hereafter. As used herein the term "connected with" is given its broadest common meaning. That is, battery end support 36 is connected with bearing 38 in that contact between the two is made. This contact may be physical contact where the opening 40 of bearing 38 rotates around the tapered end 42 of battery end support 36 thus providing a continuous moving contact between the two elements.

While the preferred embodiment of the invention includes a stationary battery tube 26 connected with bearing 38, it is of course within the scope of the invention for battery tube 26 to move with shade roll 12.

Still referring to FIG. 1, according to one embodiment, removable battery system 10 is used in conjunction with a window covering system that includes a header 44. A pair of oppositely positioned end caps 46 and 48 are connected with header 44. Shade roll 12 is connected between and supported by said end caps 46 and 48. In this regard, a support lip 50 is provided on end caps 46 and 48 that fits within a portion of the hollow interior 14 of the shade roll 12 such that shade roll 12, when moved, rotates around the support lips 50.

End covers 52 and 54 provide cosmetic covers and protective shields for the end caps 46 and 48. End cover 52 includes an opening 56 through which battery tube 26 fits and which is closed up by battery cap 28 when in operating position.

Also illustrated is circuit board 58. Circuit board 58 is connected, preferably with one or both end caps 46 and 48 and enables a user to control the operation of the system, turning on and off the power, activating the motor 60 so as to rotate and stop the shade roll 12 in one direction or another at various speeds. Circuit board 58 is any circuit board now known or hereafter developed and is well within ordinary skill levels of those in the art and is not described further hereafter.

Motor 60 is preferably connected with a gear box 62 and a drive bushing 64, as is known. Preferably, motor 60, gear box 62 and drive bushing 64 are conformed so as to fit within the hollow interior 14 of shade roll 12. Motor 60 is connected with end cap 48 as more clearly shown in FIG. 4.

FIG. 1 also illustrates a mounting bracket 66. Mounting bracket 66 is conformed to fit within an opening in a structure, such as a window opening for example only, as will be more fully described with reference to FIG. 5. Importantly, header 44 is movably connected with mounting bracket 66 according to one embodiment. As used herein the term "movably" is given its ordinary meaning and includes the element that the header 44 is movable while still being attached to the mounting bracket 66 such that access to the removable battery system 10 is enabled without having to dismantle the entire window covering system, all as will be more fully described with reference to FIG. 5. In this regard, however, mounting bracket 66 includes channel 68 within which header lip 70 is movably and releasably retained.

FIG. 1 also shows communication stick 72. Communication stick 72 provides the user the ability to remotely operate the window covering system by remote activation of the battery system 10 and hence motor 60 and ultimately shade roll 12 and shade 18 if desired.

Figure 2:
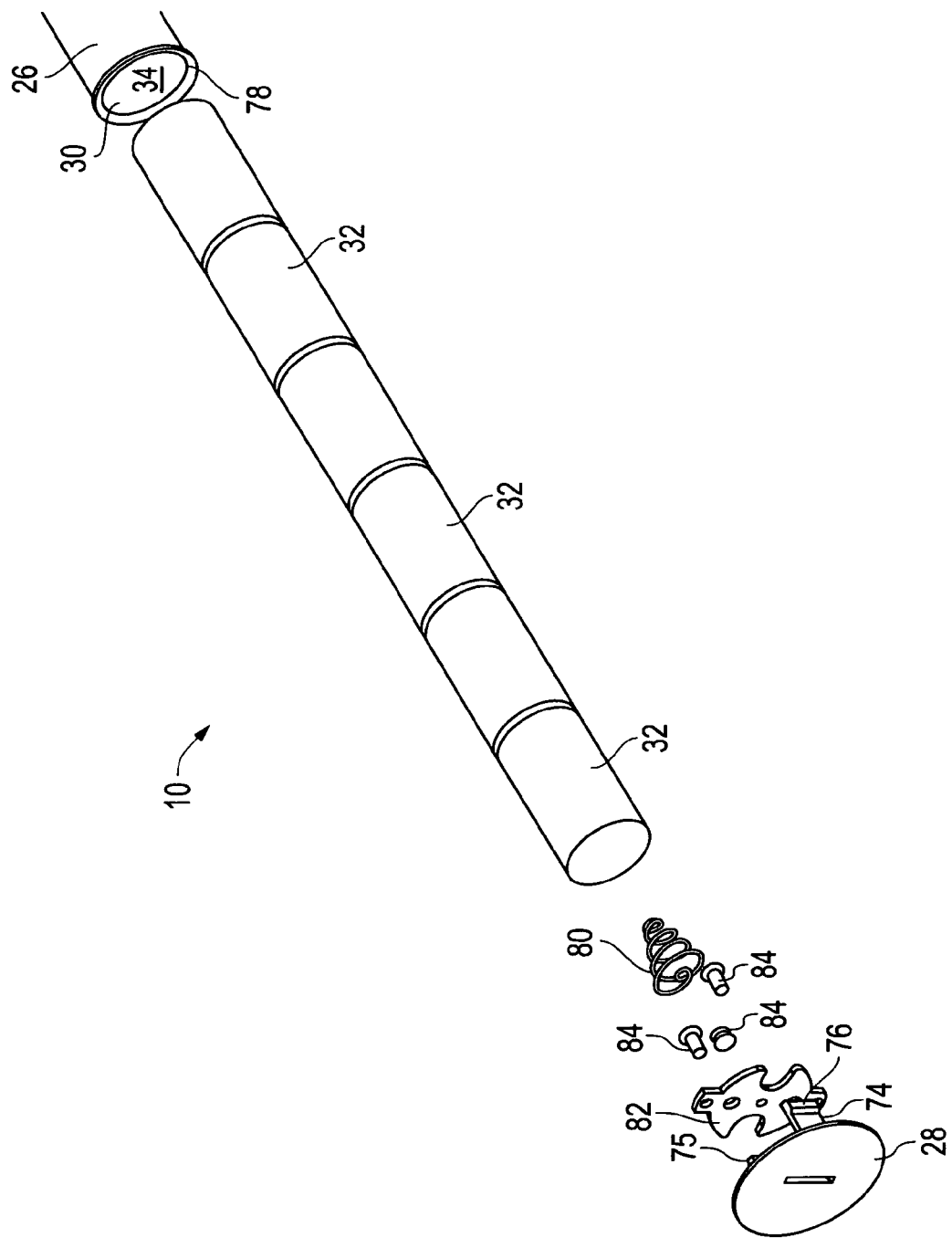
FIG. 2 is a close up exploded view of the invention showing the battery end cap, batteries and an open end of the battery tube.

Referring now to FIG. 2, a close up exploded view of the open end 30 of battery tube 26 is illustrated. In this view it is clearly shown that battery cap 28 includes a battery tube retainer 74. Battery tube retainer 74 fits within the hollow interior 34. Battery retainer 74 includes a catch 76 that extends through apertures or lock tab slots 77 (shown clearly in FIG. 3) and lock the battery tube 26 to end cap 46. FIG. 2 also shows lock tab 75 and 74 for use in connecting battery tube 26 into end cap 46. Spring 80 applies force to the battery cap 28 when connected with open end 30 of battery tube 26 to hold battery cap 28 in place. Contact holder 82 holds electrical contacts 84 in place for connection with batteries 32 and with end cap 46.

Figure 3:
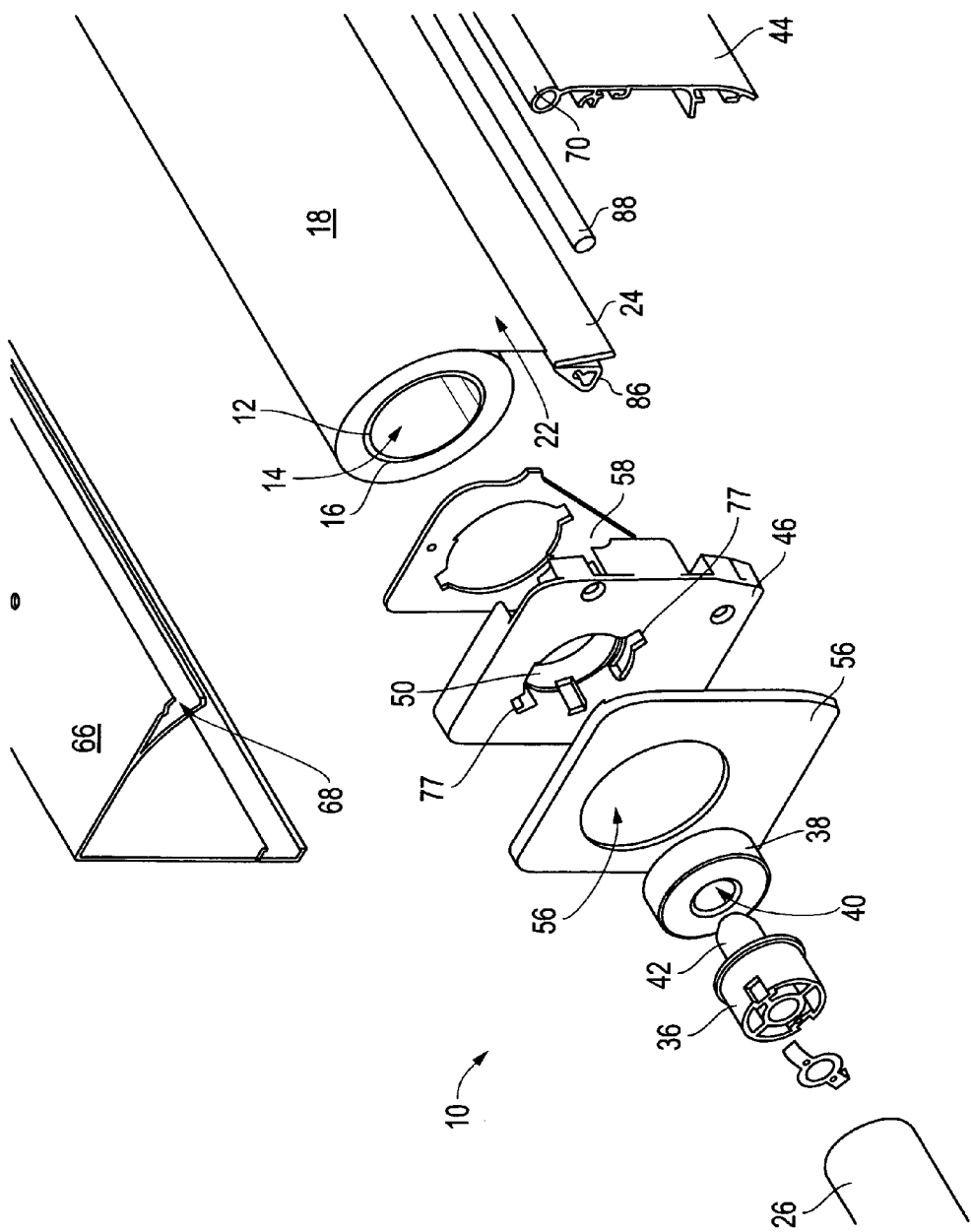
FIG. 3 is a close up exploded view of the invention showing the battery tube end support and the bearing.

Referring now to FIG. 3, elements of the invention are more clearly shown including battery end support 36 with tapered end 42. Bearing 38 is illustrated with opening 40 and the interplay of tapered end 42 and opening 40 is easily understood to provide a sure and effective connection of the two elements within hollow interior 14 of shade roll 12.

FIG. 3 also clearly shows channel 68 in mounting bracket 66 and header lip 70 in header 44. Channel 68 is made of rigid material, such as plastic or the like, that enables it to slightly expand to receive header lip 70 of header 44. Once header lip 70 is inserted into channel 68, channel 68 slightly contracts to its original form. Thus a moveable connection is made. This enables the feature of the invention that allows the header 44 to be moved while still connected with the mounting bracket 66 as will be more fully disclosed with regard to FIG. 5.

FIG. 3 also shows shade guide 86. Shade guide 86 is a guide for shade 18 and, according to one aspect of the invention, shade guide 86 provides an electrical connection between end cap 46 and end cap 48. This eliminates the need for wires and all the problems associated therewith. Certainly other electrical connections are possible as well.

FIG. 3 also shows folding rod 88, for use in folding shade 18 as more fully set forth in Applicants' co-pending US patent application. FIG. 3 also shows lock tab slots 77. Lock tab slots 77 cooperate with lock tabs 75 in battery cap 28 to secure battery tube 26 with end cap 46 and to make electrical connection between battery tube 28 and end cap 46 and, as described, with end cap 48 and motor 60.

Figure 4:
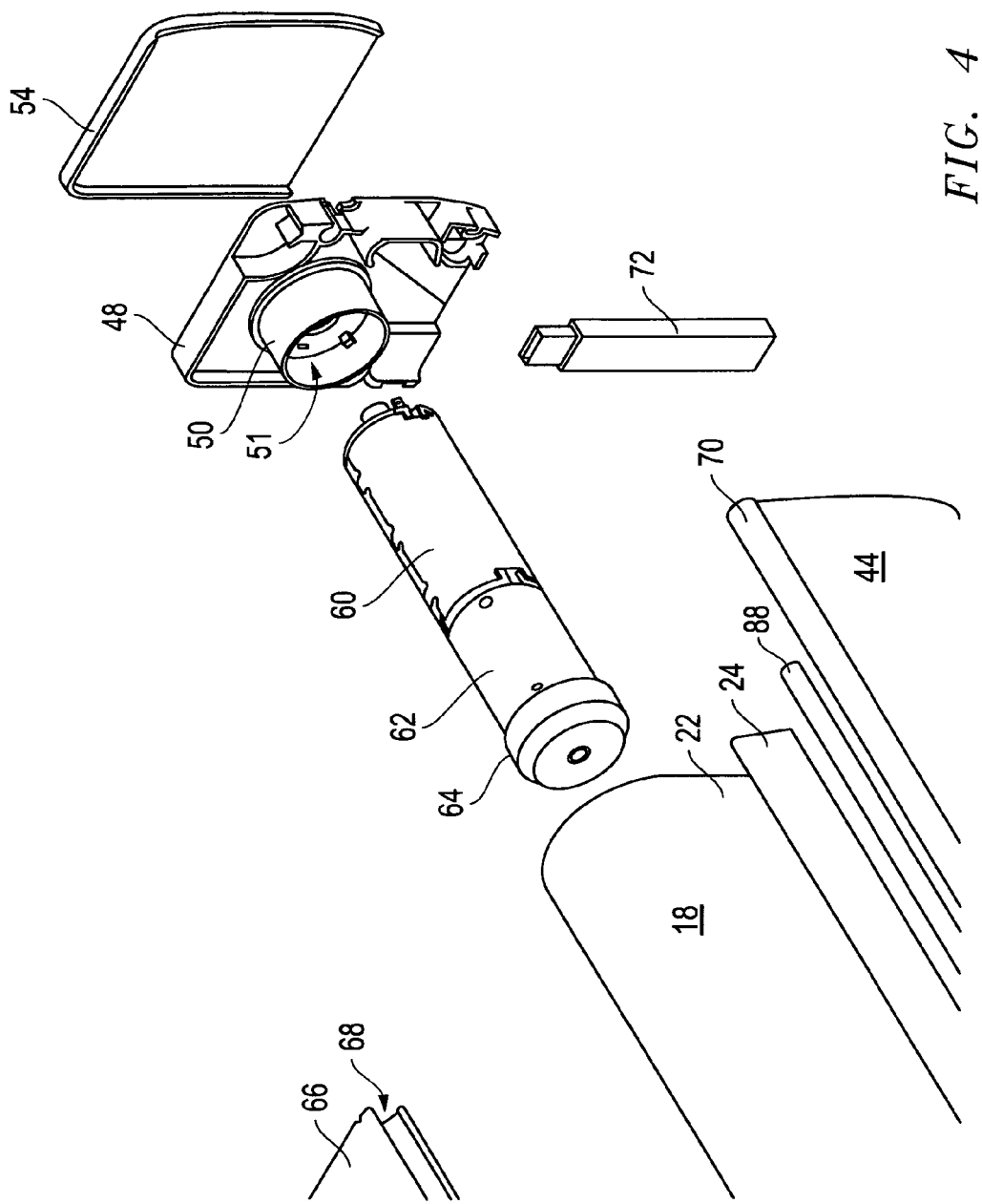
FIG. 4 is a close up exploded view of the invention according to one embodiment showing the motor.

FIG. 4 is similar to FIG. 3 in that it shows a close up view of the elements shown in FIG. 1 including a clear illustration of end cap 48 with supporting lip 50. It is easily seen that motor 60 is received within the interior 51 of lip 50. End cap 48 makes electrical connection with motor 60 which drives gear box 62 to move drive bushing 64. Drive bushing 64 is in contact with the interior 14 of shade roll 12. Communication stick 72 functions as discussed above to allow remote control of the system.

Figure 5:
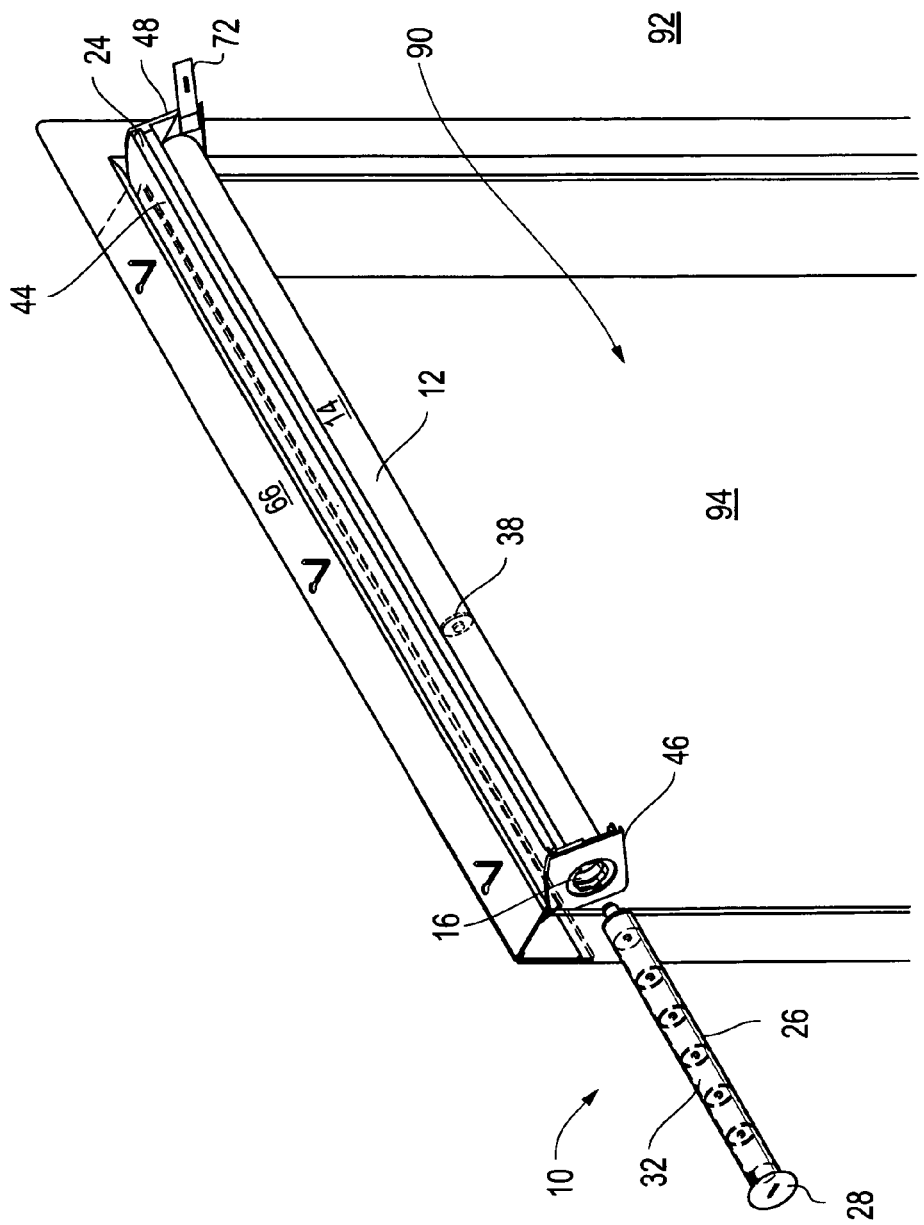
FIG. 5 is perspective view of the invention showing the header moved, while still attached to a mounting bracket, to provide access to the battery tube.

Referring now to FIG. 5, Applicants' removable battery system 10 is shown in use with a window covering system including shade roll 12 with a hollow interior 16. For example only, window covering system is used to cover window 90. Window 90 includes all the usual elements of windows in a structure 92 including window pane 94. Thus, FIG. 5 shows removable battery system 10 in use with a window covering system for use in covering and uncovering the window pane 94 of window 90 on the inside of a structure 92.

Importantly, FIG. 5 shows header 44 in a raised position having moved from an operating position while still attached to mounting bracket 66. This enables a user to access battery cap 28 so as to unlock battery tube 26 from contact with end cap 46 all while header 44 is still connected with mounting bracket 44. This is a significant improvement of the art in that it enables a user to remove battery tube 26, remove and replace batteries 32 and reconnect battery tube 26 with end cap 46 quickly and simply. It eliminates the prior art requirement of dismantling the window covering system to gain access to the working elements of the system. Once reinserted and connected, header 44 is simply folded back into operating position and the device is returned to full functionality. All of this is accomplished by way of the present invention without disturbing the motor 60 or any other elements of a shade system.

Again, by now it should be understood that Applicants' removable battery system 10 takes advantage of heretofore wasted space, the inside of shade roll 12. By Applicants' invention no additional space is required to provide a battery operated shade roll. Indeed, the wasted space is used to good advantage and provides a further benefit. The shade roll 12 acts as a sound dampener. Other battery operated systems are attached in a bulky and unattractive manner to existing systems and inevitably are noisy. Here, the batteries 32 are doubly insulated by the battery tube 26 itself and the shade roll 12. Another problem solved by the present invention is the problem of reduced battery life of batteries exposed to sunlight. Applicants understand that prior art battery systems located in areas with high temperatures, such as the western United States, experience serious degradation. That is, high temperatures greatly reduce the expected life of battery systems. Thus, a very great improvement achieved by Applicants' invention is the solar shielding of the batteries 32 within battery tube 26 located within hollow interior 14 of shade roll 12. Further, as discussed, battery tube 26 preferably does not rotate with shade roll 12. This reduces the amount of power required to move shade roll 12 and eliminates noise generated by rotation of the battery tube 26.

The description of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

What is claimed is:

1. In a window covering system with a shade roll with a hollow interior, a removable battery system comprising:
    a. a removable battery tube containing at least one battery, with a sealed first end and a sealed second end, conformed to fit within and be removed from said shade roll with a hollow interior and wherein said removable battery tube is electrically connected with said window covering system;
    b. a battery tube end support connected with said removable battery tube at said second end and sealing said second end;
    c. a bearing wherein said bearing is located within said hollow interior of the shade roll and rotates with said shade roll and wherein said battery tube end support is connected with said bearing within said shade roll but said battery tube end support and said removable battery tube do not rotate with said shade roll; and
    d. a removable battery cap connected with said first end of said removable battery tube wherein said removable battery cap seals the first end of the removable battery tube and retains said at least one battery in said removable battery tube and wherein said removable battery cap is separate from said window covering system and also includes devices for locking the removable battery tube with said window covering system such that said removable battery tube does not rotate with said shade roll and wherein, in combination, said battery tube end support and said removable battery cap create a sealed removable battery tube when within the shade roll and when removed from said shade roll.

2. The apparatus of claim 1 wherein said removable battery cap includes an electrical connection with said at least one battery.

3. The apparatus of claim 1 wherein said window covering system further includes a header with a first end support and a second end support wherein said shade roll is rotatably supported by said first end support and by said second end support and said removable battery tube is connected to and non-rotatably supported on said first end by one of said end supports.

4. The apparatus of claim 1 wherein said battery tube is an enclosed hollow tube of similar form as said shade roll but of smaller dimension.

5. The apparatus of claim 1 further including:
    a. a header with a pair of electrically connected end caps;
    b. wherein said shade roll is rotatably supported by said pair of end caps; and
    c. wherein said removable battery tube is electrically connected with said pair of end caps.

6. In a window covering system with a shade roll, a removable battery system comprising:
    a. a header with a first end cap and a second end cap wherein said end caps are electrically connected;
    b. said shade roll with a hollow interior and said shade roll rotatably supported by and between said first end cap and said second end cap;
    c. an enclosed battery tube with a first end and a second end conformed to fit within and be removed from the shade roll wherein said battery tube includes at least one battery and wherein said battery tube at said first end is supported by and electrically connected with said first end cap;
    d. a battery tube end support connected with said second end of said battery tube;
    e. a bearing wherein said bearing is located within said hollow interior of the shade roll and rotates with said shade roll and wherein said battery tube end support is connected with said bearing within said shade roll but said battery tube end support does not rotate with said shade roll; and
    f. a motor outside of said battery tube electrically connected with said second end cap and not directly connected with said battery tube.

7. The apparatus of claim 6 further including a removable battery cap connected with said first end of the battery tube wherein said removable battery cap includes locking tabs for locking the battery tube to said first end cap and for holding the at least one battery in said battery tube wherein, in combination, said battery tube end support and said removable battery cap create a sealed removable battery tube when within the shade roll and when removed from said shade roll.

8. The apparatus of claim 7 wherein said removable battery cap includes an electrical connection with said at least one battery and said first end cap.

9. The apparatus of claim 6 further including a circuit board connected with at least one of said end caps wherein said circuit board controls speed and direction of said motor.

10. The apparatus of claim 6 wherein said shade roll includes a first shade roll end and a second shade roll end and an opening in at least one shade roll end conformed to receive said battery tube such that said battery tube may be inserted and removed from said opening and wherein said battery tube seals said at least one shade roll end when inserted therein.

11. The apparatus of claim 6 wherein said battery tube is an enclosed hollow tube of similar form as said shade roll but of smaller dimension.

12. The apparatus of claim 6 further including a mounting bracket wherein said header is movably connected with said mounting bracket such that said header is movable while still connected with said mounting bracket and such that said battery tube is accessible while said header is connected with said mounting bracket.

13. In a window covering system with a shade roll, a removable battery method comprising:

a. providing a header with a first end cap and a second end cap wherein said end caps are electrically connected; said shade roll with a hollow interior and wherein said shade roll is supported by and between said first end cap and said second end cap; with an enclosed battery tube with a first end and a second end conformed to fit within the shade roll wherein said battery tube includes at least one battery and wherein said first end of said battery tube is supported by and electrically connected with said first end cap; with a battery tube end support connected with said second end of said battery tube; with a bearing wherein said bearing is located within said hollow interior of the shade roll and rotates with said shade roll and wherein said battery tube end support is connected with said bearing within said shade roll but said battery tube end support does not rotate with said shade roll; and with a motor outside of said battery tube and not directly connected with said battery tube electrically connected with said second end cap; and b. activating said at least one battery to operate said motor.

14. The method of claim 13 further including the steps of:

a. connecting a mounting bracket within an opening; and b movably connecting said header with said mounting bracket such that said header is movable while still connected with said mounting bracket and such that said battery tube is accessible while said header is connected with said mounting bracket.

15. The method of claim 14 further including the steps of:

a. moving said header from an operating position and accessing said battery tube;

b. removing said battery tube from said shade roll and replacing said at least one battery; and c. inserting said battery tube in said shade roll and moving said header back to said operating position.

* * * * *